INVENTOR
JOHN W. SWENSON
BY Kenneth T. Grace
ATTORNEY

United States Patent Office 3,589,002

Patented June 29, 1971

3,589,002

METHOD OF STRINGING APERTURED CORES

John W. Swenson, River Falls, Wis., assignor to Sperry Rand Corporation, New York, N.Y.

Filed Nov. 4, 1968, Ser. No. 772,904
Int. Cl. H01f 7/06
U.S. Cl. 29—604 13 Claims

ABSTRACT OF THE DISCLOSURE

A method of core-stringing a plurality of two-dimensional core planes, each core plane comprising a plurality of apertured cores aligned along X and Y drive line axes. The method involves stringing the core planes along aligned X drive line axes, stringing the core planes along aligned Y drive line axes, folding the core planes accordian-like into a stacked, superposed three-dimensional core array and then pulling taut the X and Y drive lines.

BACKGROUND OF THE INVENTION

The present invention relates to a method of stringing a plurality of apertured elements along different aligned axes, and in particular to the electronic data processing art of core-stringing a plurality of two-dimensional memory core planes into a three-dimensional memory core array. The present invention may be considered to be an improvement invention over that of the L. Crown et al. Pat. No. 3,139,610 which is directed toward a method of fabricating a folded three-dimensional core array of a plurality of two-dimensional core planes with X and Y drive lines that are continuous throughout the core array. The plurality of two-dimensional core planes are arranged along a longitudinal axis, in the plane of the two-dimensional core planes, that is oriented at an angle of 45° to the orthogonally arranged X and Y drive line axes. Each of the X and Y drive lines threads all the cores along the associated like X and Y drive line axes at a 45° angle with respect to the longitudinal axis of the serially aligned two-dimensional core planes proceeding through each subsequent aligned X and Y drive line axes aligned cores at alternating + and −45° angles with respect to the longitudinal axis of the serially aligned two-dimensional core planes. Upon completion of the core-stringing of the X and Y drive lines the plurality of two-dimensional core planes are folded accordian-like into a stacked, superposed three-dimensional core array with the continuous X and Y drive lines terminating at appropriate electrical connections at their respective ends at the top and bottom two-dimensional core planes. This technique substantially reduces the number of interplane connections by utilizing continuous X and Y drive lines. However, this technique is extremely awkward in that the plurality of two-dimensional core planes are not aligned along either their X or Y drive line axes requiring the X and Y drive lines to enter each next subsequent two-dimensional core plane of the serially aligned two-dimensional core planes at 90° angles. This changing of direction of the X and Y drive lines as they pass between succeeding two-dimensional core planes precludes the utilization of mechanized core-stringing techniques.

With the advent of the use of increasingly larger memory core arrays in the electronic data processing field it has been necessary to mechanize the core-stringing operation to reduce the cost of a memory core array when fabricated by previously utilized hand stringing techniques as would be required by the technique of Crown et al. Pat. No. 3,139,610 as discussed above. In the Fielder et al. Pat. No. 3,331,126 there is disclosed a core-stringing machine that simultaneously threads all the drive lines along the parallel sets of rows or columns of a two-dimensional array of toroidal cores. This core-stringing machine may utilize as a core nest a device such as disclosed in the patent application of A. R. Hanson et al., Ser. No. 518,060, filed Jan. 3, 1963, now Pat. No. 3,421,865.

SUMMARY OF THE INVENTION

In the present invention such a core nest provides a tooling function for the alignment of toroidal cores during the mechanized core-stringing operation. The present invention provides a technique whereby a plurality of two-dimensional core planes, each core plane comprising a plurality of apertured cores aligned along X and Y drive line axes may be aligned along their like X drive line axes whereby all the aligned core planes may be simultaneously threaded by all the X drive lines continuously through the aligned plurality of two-dimensional core planes then aligning the two-dimensional core planes along their like Y drive line axes and simultaneously threading all the cores of the aligned two-dimensional core planes along their drive line axes whereby all the cores of the plurality of two-dimensional core planes may be threaded by a core-stringing machine with continuous X and Y drive lines.

DESCRIPTION OF THE PREFERRED EMBODIMENT

Figure 1:
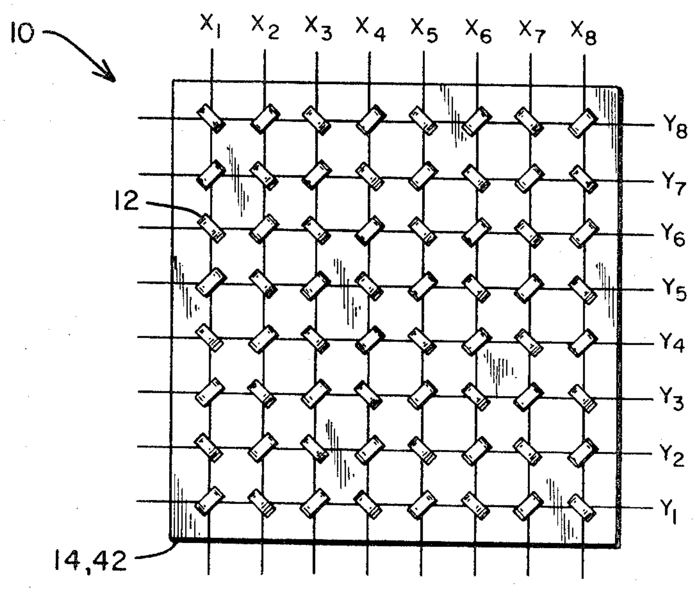
FIG. 1 is an illustration of a two-dimensional core plane comprising a plurality of apertured cores aligned along X and Y drive line axes.

With particular reference to FIG. 1 there is presented an illustration of a two-dimensional core plane 10 comprising a plurality of apertured cores 12 aligned along X and Y drive line axes. Cores 12 are aligned along first and second different directional sets of parallel, diagonal rows, that bisect the XY drive line axis intersections, one core 12 at each XY drive line axis intersection. The two-dimensional core plane 10 arrangement of the plurality of apertured cores 12 illustrated in FIG. 1 is only one arrangement that may be utilized by the present invention; any arrangement of apertured cores permitting the threading by different directioned sets of parallel drive lines may be employed. As an example of other useful arrangements see the copending patent application of J. F. Bruder et al., Ser. No. 539,481, filed Apr. 1, 1966, now Pat. No. 3,465,313.

Ordinary magnetizable cores and circuits utilized in electronic data processing systems are now so well-known that they need no special description herein. However, for purposes of the present invention, it should be understood that such magnetizable cores are capable of being magnetized to saturation in either one of two opposite directions of polarization. Furthermore, these cores are formed of a magnetizable material selected to have a rectangular hysteresis characteristic which ensures that after the core has been saturated in either direction a definite point of magnetic remanence representing the residual flux density in the core will be retained. The residual flux density representing the point of magnetic remanence in the core possessing such characteristics is preferably of substantially the same magnitude as that of its maximum saturation flux density. These magnetic core elements are usually connected in circuits providing one or more input coils for purposes of switching the cores magnetic state corresponding to a particular direction of saturation, i.e., positive saturation denoting a binary "1" to the other magnetic state corresponding to the opposite direction of saturation, i.e., negative saturation, denoting a binary "0." One or more output coils, or sense lines, are usually provided to sense when the core switches from one state of saturation to the other. Switching can be achieved by passing a current pulse of sufficient amplitude through the input winding in a manner so as to set up a magnetic field in the area of the magnetizable core in the sense opposite to the pre-existing flux direction, thereby driving the core to saturation in the opposite direction of polarity, i.e., of positive to negative saturation. When the core switches, the resulting magnetic field variation induces a signal in the winding on the core such as, for example, the above-mentioned output or sense winding. The material of the core may be formed of various magnetizable materials. The terms "signal," "pulse," etc. when used herein shall be used interchangeably to refer to the current signal that produces the corresponding magnetic field and to the magnetic field that is produced by the corresponding current signal.

One well-known technique of achieving readout of a magnetizable memory element, or core, is that of the well-known coincident current, i.e., bit-organized technique. This method utilizes the threshold characteristic of a core having a substantially rectangular hysteresis characteristic. In this technique, a minimum of two interrogate lines thread the core's central aperture, each interrogate line setting up a magneto-motive force in the memory core that is one-half the magneto-motive force necessary to completely switch the memory core from the first to a second and opposite magnetic state while the magneto-motive force set up by each separate interrogate winding is of insufficient magnitude to effect a substantial change in the memory core's magnetic state. A sense winding threads the core's central aperture and detects the memory core's substantial, or insubstantial, magnetic change as an indication of the information content of such core.

Another well-known technique of achieving readout of a magnetizable memory element, or core, is that of the well-known word-organized technique. This method utilizes a separate interrogate line per multibit word wherein each line threads the associated core's central aperture. The separate interrogate line sets up a magnetomotive force in the coupled memory core that is sufficient to completely switch the memory core from a first to a second and opposite magnetic state. In this technique each like-ordered bit of the multibit words of the two-dimensional array is coupled to a like-ordered sense line wherein there are as many separate sense lines per two-dimensional core array as there are bits in the multibit words.

Typical three-dimensional bit-organized memory systems that are utilized in present day electronic data processing systems are comprised of a plurality Z of similar two-dimensional arrays of toroidal ferrite cores. The cores of each two-dimensional array are arranged in X columns and Y rows with a core at the intersection of each column and row; providing XY cores for each two-dimensional array or a total of XYZ cores for three each three-dimensional array. Conventionally, in each two-dimensional array all of the cores along each X column are threaded by a separate X drive line and all the cores along each Y row are threaded by a separate Y drive line. Accordingly, the energization of one selected X drive line and one selected Y drive line per two-dimensional array by half-select current signals fully selects the one core at the intersection of the selected X and Y drive lines and one-half selects the other cores along the selected X and Y drive lines while the other cores of the two-dimensional array are not directly affected by the half-select signals. Further, conventionally, all the cores of each two-dimensional array are threaded by a separate sense line for carrying off the signals induced therein by the effecting of a threaded core by the selection currents and are threaded by an inhibit line for conducting an inhibit current signal of the same magnitude as, but of the opposite polarity to, the half-select signals for inhibiting the substantial effecting of the magnetization of the fully selected core. The present invention is directed toward a method of core-stringing the parallel X and parallel Y drive lines of the two-dimensional arrays of either bit-organized or word-organized memory systems.

The three-dimensional memory system is generally assembled by the serial interconnection of the like positioned X drive lines of each two-dimensional array and by the serial interconnection of the like positioned Y drive lines of each two-dimensional array while the sense line and the inhibit line of each two-dimensional array are retained as separate lines. By the energization, or selection, of one of the serially interconnected X drive lines and one of the serially interconnected Y drive lines of the three-dimensional system, each like position core on each two-dimensional array of such a bit-organized memory system is effected by a full-select current signal whereby a signal is induced in the sense line of each two-dimensional array that is representative of the magnetic state, or information content, of the fully selected cores of the three-dimensional array. In this arrangement the length of the stored multibit word is equal to the number Z of the separate two-dimensional arrays whereby Z bits are read out in parallel upon energization of one interconnected X drive line and one interconnected Y drive line of the three-dimensional system. For the bit-organized writing operation one of the serially interconnected X drive lines and one of the serially interconnected Y drive lines of the three-dimensional system are each energized by half-selected current signals of appropriate polarity to the readout current signals thereby setting the fully selected core in each two-dimensional array in a "1" state. If it is desired that a fully selected core is to be set into a "0" state, i.e., permitted to remain in its initial set state established by the readout operation, the inhibit line associated with the two-dimensional array in which the "0" is included is energized by a half-select inhibit current signal that is similar to the half-select readout signal. The inhibit signal inhibits the writing of a "1" permitting the effective core to remain in its set "0" state.

With particular reference back to FIG. 1 the illustrated two-dimensional core plane 10 a plurality of apertured cores 12 aligned along a plurality of X drive line axes, e.g., X drive line axes X1–X8, and along a plurality of aligned Y drive line axes, e.g., Y drive line axes Y1–Y8. For the mechanized core-stringing operation, the plurality of cores 12 of the two-dimensional core plane 10 preferably utilize a core nest 14 as a tooling fixture for maintaining the alignment of the cores 12 during the core-stringing operation. Core nest 14 may be similar to that disclosed in the copending patent application of A. R. Hanson et al., Ser. No. 518,060, filed Jan. 3, 1966, now Patent No. 3,421,865. Additionally, the core-stringing operation is preferably mechanized by a core-stringing machine such as that disclosed in the F. A. Fielder et al., Patent No. 3,331,126 that simultaneously threads all the lines along the parallel sets of rows or columns of a two-dimensional array of toroidal cores.

Figure 2:
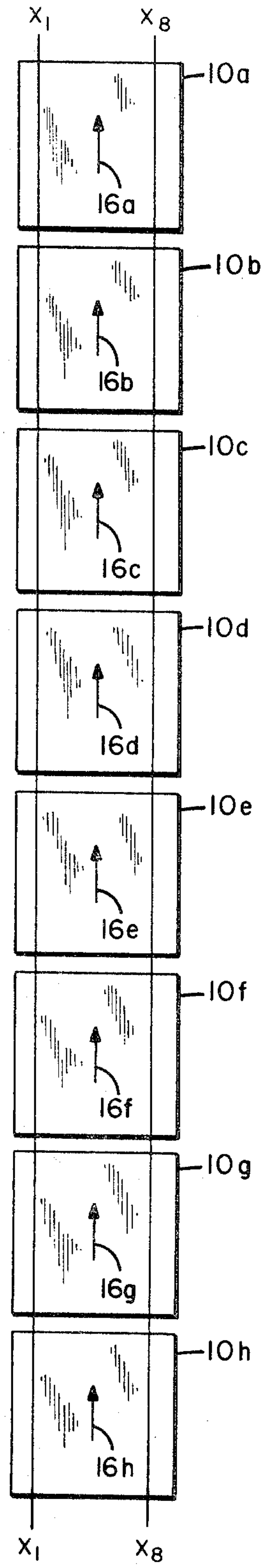
FIG. 2 is an illustration of a plurality of core planes of FIG. 1 serially aligned along their like X drive line axes.

With particular reference to FIG. 2 there is presented an illustration of a plurality of core planes 10 of FIG. 1 serially aligned along their like X drive axes X1–X8. Core planes 10*a*–10*h*, for the mechanized core-stringing of the X1–X8 drive lines along their corresponding aligned like X drive line axes X1–X8, are preferably oriented in a plurality of core nests 14 as previously discussed with particular reference to FIG. 1. Each core plane 10*a*–10*h* has superimposed thereon a corresponding arrow 16*a*–16*h* for schematically depicting the orientation of the core planes 10 during the method of the present invention. As will be discussed in greater detail below the present invention involves the method of core-stringing a plurality of two-dimensional core planes 10, each core plane comprising a plurality of cores 12 aligned along X and Y drive line axes, the method consisting of the essential steps:

(a) Stringing the cores 12 of the core planes 10*a*–10*h* with a plurality of continuous X drive lines X1–X8 each along an aligned like X drive line axis X1–X8.

(b) Stringing the cores 12 of the core planes 10*a*–10*h* with a plurality of continuous Y drive lines Y1–Y8, each along an aligned like Y drive line axis Y1–Y8.

(c) Folding the plurality of core planes 10 accordian-like into a stacked, superposed three-dimensional core array.

In a preferred employment of the present invention the method of core-stringing a plurality of similar, two-dimensional core planes 10*a*–10*h*, each core plane 10 comprising a plurality of apertured cores 12 aligned along like X and Y drive line axes by a like plurality of X and Y drive lines, comprises the following steps.

(1) Initially, the plurality of core planes 10*a*–10*h* are serially aligned along their like X drive line axes X1–X8 as illustrated in FIG. 2. During this step, the cores 12 of each core plane 10 are preferably oriented in their respectively proper position by a core nest 14. Alternatively, the cores 12 could be properly oriented by any other well-known method such as an adhesive segment 42 utilized in the hereinabove discussed L. Crown et al., Patent No. 3,139,610. Additionally, it is preferred that the core planes 10*a*–10*h* be aligned along the like X drive line axes in substantially contiguous relationships providing minimum spacing between adjacent core planes 10.

(2) The plurality of continuous X drive lines X1–X8, each along the aligned like X drive line axis X1–X8, are simultaneously strung, or threaded, through the apertures of the cores 12 of the plurality of core planes 10*a*–10*h*.

(3) After completion of Step 2 above the plurality of core planes 10*a*–10*h* are separated from their previous substantially contiguous relationships along the aligned like X drive line axes for forming slack portions of the X drive lines X1–X8 intermediate each aligned adjacent core plane 10.

(4) Next, the plurality of serially aligned core planes 10*a*–10*h* are rotated, in the plane of the core planes 10, 90° alternately for serially aligning the plurality of core planes 10*a*–10*h* along their aligned like Y drive line axes Y1–Y8. As after Step 1 above, it is preferred that the plurality of core planes 10*a*–10*h* are aligned along their like Y drive line axes Y1–Y8 in substantially contiguous relationships for providing minimum spacing between adjacent core planes 10.

Figure 3:
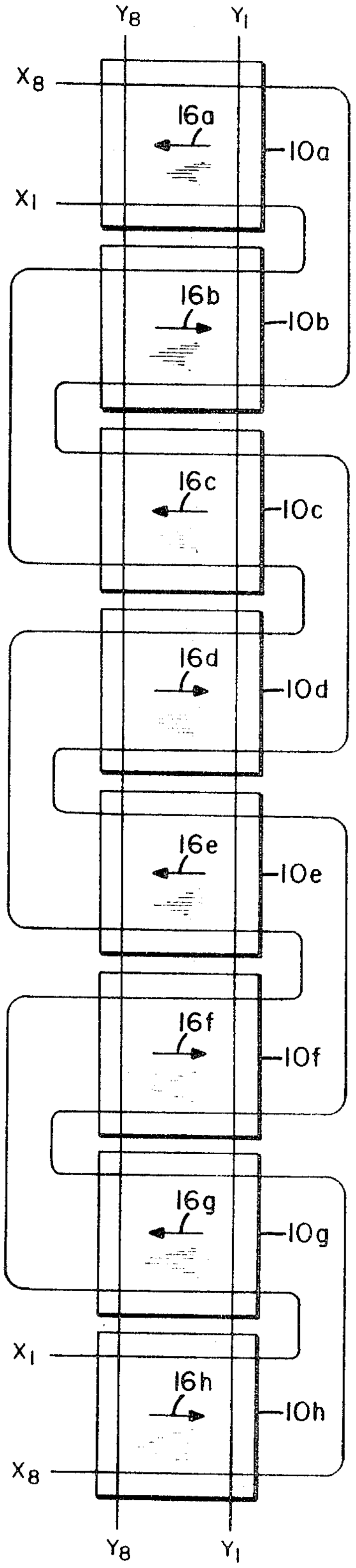
FIG. 3 is an illustration of the core planes of FIG. 2 serially aligned along their like Y drive line axes.

With particular reference to FIG. 3 there is presented an illustration of the core planes 10*a*–10*h* of FIG. 2 serially aligned along their like Y drive line axes Y1–Y8 in preparation for the stringing of the plurality of continuous Y drive lines Y1–Y8 through the apertures of the cores 12 of the plurality of core planes 10*a*–10*h* along the aligned like Y drive axes Y1–Y8. The arrows 16*a*–16*h* associated with the respective core planes 10*a*–10*h* diagrammatically illustrate the orientation of the core planes 10 after their 90° alternate rotation from their serially aligned orientation of FIG. 2 into their aligned like Y drive line axes Y1–Y8 orientation of FIG. 3.

(5) The plurality of continuous Y Ydrive lines Y1–Y8 are strung through the apertures of the cores 12 of the plurality of core planes 10*a*–10*h*, each along the aligned like Y drive line axis Y1–Y8 as in Step 2 above.

(6) After completion of Step 5 above the plurality of core planes 10*a*–10*h* are separated from their previous substantially contiguous relationships along the aligned like Y drive line axes Y1–Y8 for forming slack portions of the Y drive lines Y1–Y8 intermediate each aligned adjacent core plane 10.

After completion of Step 5 the core planes 10*a*–10*h* have been threaded by their X drive lines X1–X8 and their Y drive lines Y1–Y8 much as illustrated in FIG. 3.

(7) Next, in preparation for the orientation of the core planes 10*a*–10*h* into their respectively associated core frames 40*a*–40*h*, the core planes 10*a*–10*h* each have affixed thereto a respectively associated adhesive segment 42*a*–42*h*. Adhesive segments 42*a*–42*h* are here utilized when, in the previous Steps 1–6 the cores 12 are oriented in their respectively associated core planes 10*a*–10*h* by a core nest 14 as previously discussed with particular reference to FIG. 1. If, adhesive segments had been utilized in Steps 1–6 instead of the core nests 14 such previously utilized adhesive segments would be retained for the next subsequent step. The adhesive segments 42*a*–42*h* are utilized to maintain the cores 12 of each associated core plane 10 in their respective orientation with the other cores of the associated core plane 10 as is required for the subsequent stringing of the sense and/or inhibit lines, where such additional lines are required. Additionally, the adhesive segments 42*a*–42*h* are utilized to aid the orientation of the core planes 10*a*–10*h* in their respectively associated core frames 40*a*–40*h* as particularly illustrated in FIG. 4.

Figures 4, 5, 6:
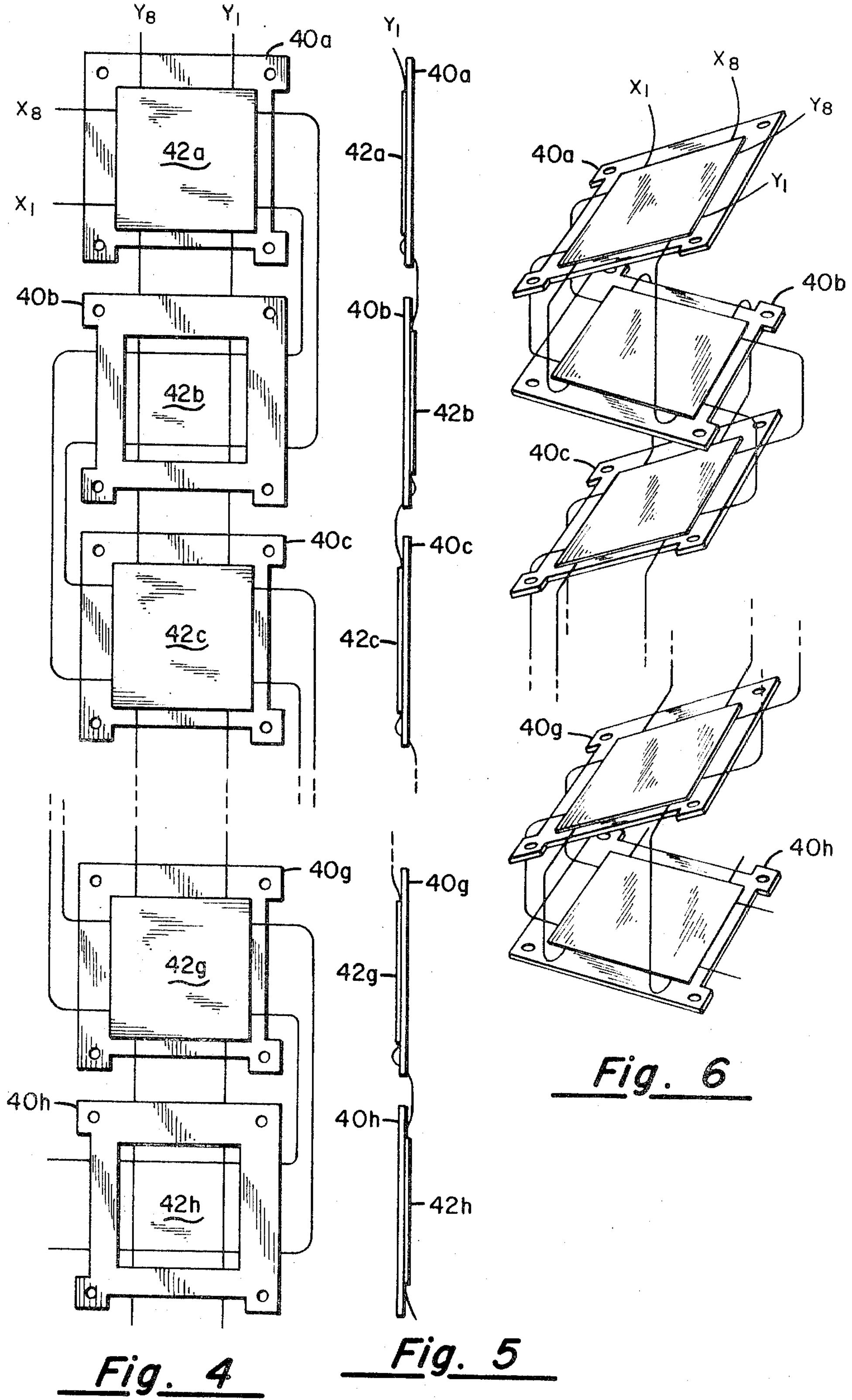
FIG. 4 is an illustration of the core planes of FIG. 3 oriented in their associated core frame members.
FIG. 5 is an illustration of the side view of the arrangement of FIG. 4.
FIG. 6 is an illustration of an exploded view of the arrangement of FIG. 4 showing the accordian-like folding technique utilized to achieved a three-dimensional core array.

(8) With the cores 12 of each core plane 10*a*–10*h* maintained in their respective orientations by their associated adhesive segment 42*a*–42*h*, core planes 10*a*–10*h* are then oriented within the apertures of the respectively associated core frames 40*a*–40*h*. With particular reference to FIGS. 4 and 5 there are presented illustrations of the core planes 10*a*–10*h* of FIG. 3 oriented in their associated core frames 40*a*–40*h*. Each core plane 10 may be temporarily secured within the aperture of its respectively associated core frame 40 by its respectively associated adhesive segment 42, or alternatively, additional adhesive segments may be utilized as is well-known in the art.

(9) After orienting the plurality of core planes 10*a*–10*h* in their respectively associated core frames 40*a*–40*h* as illustrated in FIG. 4 the plurality of core frames 40*a*–40*h* are folded alternately down and up across the X and Y drive lines. With particular reference to FIG. 6 there is presented an illustration of an exploded view of the arrangement of FIG. 4 showing the accordian-like folding technique utilized to achieve a three-dimensional core array.

Figure 7:
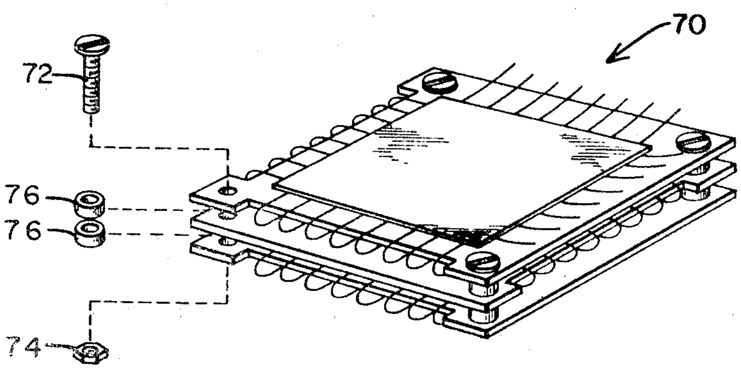
FIG. 7 is an illustration of the three-dimensional core array provided by the present invention.

(10) Following the folding of the plurality of core frames 40*a*–40*h* in an accordian-like manner, the slack X drive lines X1–X8 and Y drive lines Y1–Y8 are drawn, or pulled, taut through their respectively associated aligned cores. In this manner, the slack portions of the X and Y drive lines formed during Steps 3 and 6 above which form the interplane connections between adjacent core planes 10 are substantially reduced forming minimum interplane X and Y drive line lengths. With particular reference to FIG. 7 there is presented an illustration of the three-dimensional core array 70 provided by the present invention. In the core array 70 of FIG. 7 the like X and Y drive lines are preferably oriented in a parallel, superposed configuration.

(11) Next, the stacked, superposed plurality of core planes 10*a*–10*h* are assembled into an integral assembly by the use of assembling hardware such as bolts 72, nuts 74 and suitable spacers 76.

(12) Lastly, the plurality of continuous X and Y drive lines are, at their respective ends, coupled to the top and bottom core frames 40*a*, 40*h* of core array 70. A plurality of electrical terminals such as those disclosed in the C. T. Crawford et al., Pat. No. 3,382,572 may be utilized as a means for coupling external circuitry to the X and Y drive lines that are internal to core array 70.

As noted hereinabove a core array 70, as provided by the present invention, may include other intraplane lines such as the hereinabove discussed sense and inhibit lines that may be utilized with the well-known bit-organized or word-organized memory selection systems. It is to be appreciated, therefore, that such intraplane drive lines and sense lines could be threaded through the core planes 10*a*–10*h* in many of the well-known manners. As an example, see the above referenced copending patent application of J. F. Bruder et al. for some sense line wiring patterns that may be utilized in a bit-organized memory array 70. Additionally, the adhesive segments 42*a*–42*h* utilized in Step 7 above may include a material functioning as an electromagnetic shield whereby such adhesive segments 42*a*–42*h* may be left on their asociated core frames 40*a*–40*h* to function as electromagnetic shielding elements between adjacent, superposed core planes 10 in core array 70.

It is apparent therefore that there has been disclosed herein a novel method of core stringing a plurality of two-dimensional core planes with continuous X and Y drive lines threading along aligned like X and Y drive line axes all the similarly aligned cores of a three-dimensional core array thereby eliminating the interplane electrical connections utilized in prior art three-dimensional core arrays. Accordingly, it is to be appreciated that applicant's inventive concept is not to be limited to the specific steps presented but is to extend to any method incorporating the inventive concept of the present invention. It is, therefore, understood that suitable modifications may be made in the specific method disclosed provided such modifications come within the spirit and scope of the appended claims.

Having now, therefore, fully illustrated and described my invention, what I claim to be new and desire to protest by Letters Patent is set forth in the appended claims:

1. A method of core-stringing a plurality of similar, two-dimensional core planes, each core plane comprising a plurality of apertured cores aligned along X and Y drive line axes, the method comprising the following steps:

(a) serially aligning a plurality of similar, two-dimensional core planes along like X drive line axes;
(b) stringing through the apertures of the cores of the plurality of core planes a plurality of continuous X drive lines each along the aligned like X drive line axis;
(c) rotating in the plane of the core planes the plurality of serially aligned core planes, each plane 90° in alternate directions with its adjacent planes for serially aligning the plurality of core planes along like Y drive line axes;
(d) stringing through the apertures of the cores of the plurality of core planes a plurality of continuous Y drive lines, each along the aligned like Y drive line axis;
(e) folding the plurality of core planes alternately down and up across the like X or Y drive lines;
(f) forming a stacked, superposed three-dimensional core array of the plurality of core planes.

2. The method of claim 1 in which Step (*a*) includes aligning the core planes along the like X drive axes in substantially contiguous relationships.

3. The method of claim 2 including a Step (*b'*) intermediate Steps (*b*) and (*c*), in which the plurality of core planes are separated from their previous substantially contiguous relationships along the like X drive line axes for forming slack portions of the X drive lines intermediate each aligned core plane.

4. The method of claim 3 in which Step (*c*) includes aligning the core planes along the like Y drive line axes in substantially contiguous relationships.

5. The method of claim 4 including a Step (*d'*) intermediate Steps (*d*) and (*e*), in which the plurality of core planes are separated from their previous substantially contiguous relationships along the like Y drive line axes for forming slack portions of the Y drive lines intermediate each aligned core plane.

6. The method of claim 5 in which Step (*f*) includes pulling taut the slack X and Y drive lines.

7. The method of claim 5 in which Step (*f*) includes stacking the core planes with their like X and Y drive lines in a parallel, superposed configuration.

8. The method of claim 1 in which the plurality of cores of each plane are secured in their aligned relationships during the core stringing operation by an adhesive tape segment.

9. The method of claim 5 further including a Step (*d''*) intermediate Steps (*d'*) and (*e*) comprising orienting each core plane in an associated core frame.

10. The method of claim 9 further including a Step (*g*) in which the X and Y drive lines, at their respective ends, are coupled to the top and bottom core frames of the core array.

11. The method of claim 5 in which the plurality of cores of each core plane are secured in their aligned relationships during the X and Y drive line stringing operation by a core nest.

12. The method of claim 11 including a Step (*d'*) intermediate Step (*d*) and (*d'*) in which the plurality of cores of each core plane are secured in place by an adhesive segment.

13. The method of claim 12 including a Step (*d''*) intermediate Steps (*d'*) and (*e*) comprising orienting each core plane in an associated core frame.

References Cited

UNITED STATES PATENTS

| | | | |
|---|---|---|---|
| 3,139,610 | 6/1964 | Crown | 340—174 |
| 3,188,721 | 6/1965 | Ringler | 29—604 |
| 3,266,126 | 8/1966 | Dowling | 29—604 |
| 3,314,131 | 4/1967 | Judge | 29—604 |

JOHN F. CAMPBELL, Primary Examiner

C. E. HALL, Assistant Examiner

U.S. Cl. X.R.

29—433; 340—174

UNITED STATES PATENT OFFICE

CERTIFICATE OF CORRECTION

Patent No. 3,589,002 Dated June 29, 1971

Inventor(s) John W. Swenson

It is certified that error appears in the above-identified patent and that said Letters Patent are hereby corrected as shown below:

Column 8, line 1, after "drive" insert -- line --; line 24, after "each" insert -- core --; line 38, "(d')" should read -- $(d_1)$ --.

Signed and sealed this 2nd day of May 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334